(Model.)
S. NEEDLES.
SHOE OR GLOVE FASTENER.
No. 256,442.            Patented Apr. 11, 1882.
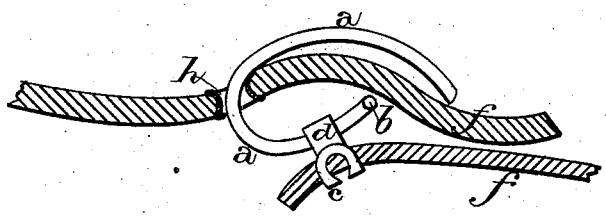
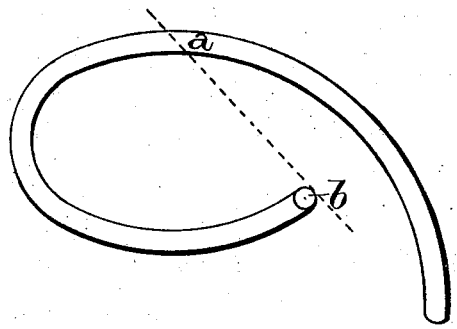
 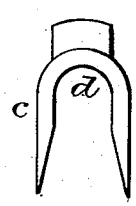 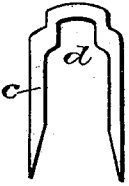
Witnesses.
W. W. Mortimer,
W. H. Kern.
Inventor.
S. Needles,
per
F. A. Lehmann,
Atty.

UNITED STATES PATENT OFFICE.

SIMGESMER NEEDLES, OF SEDALIA, MISSOURI.

SHOE OR GLOVE FASTENER.

SPECIFICATION forming part of Letters Patent No. 256,442, dated April 11, 1882.

Application filed November 14, 1881. (Model.)

*To all whom it may concern:*

Be it known that I, S. NEEDLES, of the city of Sedalia, in the county of Pettis and State of Missouri, have invented certain new and useful Improvements in Shoe or Glove Fasteners; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

My invention relates to an improvement in fastenings for gloves and shoes; and it consists in the combination of a suitable holding-staple or other device, which is fastened to one part of the article, with an endwise-moving hook which is provided with a stop upon its shorter end, and which hook is passed through a hole in the other part of the article which is to be fastened to the part to which the staple is secured.

The object of my invention is to produce a fastening for shoes and gloves, by means of which I am enabled to dispense with the use of buttons and furnish a more durable and convenient fastening than is now in common use, and to enable the manufacturer to prepare shoes for sale without the trouble to dealers of resetting the buttons.

Figure 1 is a side elevation of my invention, partly in section. Fig. 2 is a section of the hook, taken in such a way as to show the stop upon its end. Fig. 3 is a side elevation of the hook alone, and Figs. 4 and 5 are different views of the staple.

$f$ represents the two parts of the glove or shoe which are to be fastened together, one of which is provided with the eyelet $h$ for the hook $a$ to pass through. This hook $a$ is made, as shown in Figs. 1 and 3, so as to have one of its prongs considerably longer than the other, and this longer prong is passed through the eyelet $h$, while the other prong is loosely held by the staple $d$. The staple $d$ is so shaped as to straddle over the top of the shorter end of the hook $a$, and the prongs $c$ of the staple are then forced through the material $f$ and clinched. The shorter end of the hook has an endwise sliding movement through the staple, and in order to prevent the hook from being drawn out of the staple a stop, $b$, is formed upon its end.

In order to fasten the glove or shoe by means of the hook, the short end of the hook is first moved endwise through the staple, so as to bring the long end into an inclined position extending over toward the eyelet $h$. After the long end of the hook has been passed through this eyelet this end is drawn over toward the right until it assumes the position shown in Fig. 1, when the two parts of the article $f$ will be held securely in place. Owing to the oval end of the hook the greater the strain that is brought to bear upon the two parts $f$ the more securely they are fastened together.

Having thus described my invention, I claim—

In a glove and shoe fastener, the combination of the hook, having a stop formed on one end, and the staple, by means of which the hook is secured in place, the hook having an endwise sliding movement through the staple, substantially as described.

SIMGESMER NEEDLES.

Witnesses:
WM. BRAY,
WM. A. KERR.